United States Patent [19]

Hurlbut

[11] 4,403,459
[45] Sep. 13, 1983

[54] BENCHMARK FOR USE IN ARCTIC REGIONS

[75] Inventor: Roy B. Hurlbut, Vancouver, Wash.

[73] Assignee: Atlantic Richfield Co., Los Angeles, Calif.

[21] Appl. No.: 228,815

[22] Filed: Jan. 27, 1981

[51] Int. Cl.³ .......................... E01F 9/02; E04H 13/00
[52] U.S. Cl. ..................................... 52/103; 405/130; 405/211
[58] Field of Search ................................. 52/103–167, 52/169.11, 169.13, 742; 116/209; 405/130, 217, 227, 228, 211; 73/340

[56] References Cited

U.S. PATENT DOCUMENTS

| | | | |
|---|---|---|---|
| 608,797 | 8/1898 | Runyon | 52/169.11 |
| 837,820 | 12/1906 | Folsom et al. | 52/168 |
| 3,166,041 | 1/1965 | Caggainello | 116/209 |
| 3,720,065 | 3/1973 | Sherard | 405/130 |
| 3,859,800 | 1/1975 | Wuelpern | 405/130 |
| 3,921,410 | 11/1975 | Philo | 405/234 |
| 3,926,259 | 12/1975 | Perkins | 405/130 |
| 4,102,194 | 7/1978 | Eng | 73/340 |

OTHER PUBLICATIONS

"Sealed Tube Keeps Frost Frozen to Hold Buildings" Engineering News-Record, Jul. 3, 1969, p. 16.

Primary Examiner—John E. Murtagh
Assistant Examiner—Mark J. Sofia
Attorney, Agent, or Firm—Drude Faulconer

[57] ABSTRACT

Method and apparatus for installing a benchmark in an arctic region to provide an accurate, reliable reference point even after prolonged periods of exposure. To install the benchmark, a hole is formed through the active layer and into the underlying layer. An alignment jig mounts a marker element in a casing and both are positioned into the hole. A leveling clamp on the casing is used to plumb and adjust the marker element to a known elevation. The marker element extends to the bottom of the hole while the casing terminates at a depth which is above the bottom of the hole but below the bottom of the active layer. A settable material, e.g. sand-water slurry which will freeze at ambient conditions, is poured into the hole to a point just above the lower end of the casing and is allowed to set after which the remainder of the hole around the casing is filled. The annulus within the casing around the marker element is filled with fluidic material which will not freeze under ambient conditions, e.g. grease. Since the marker element does not directly contact any part of the active layer, the marker element is effectively isolated from contact therewith so that the thawing and refreezing of the active layer do not disturb the position or elevation of the benchmark. Temperature sensors, positioned along the marker element, provides temperature readings for which expansion coefficients are known which, in turn, are used to correct the actual elevational readings taken during a survey.

4 Claims, 9 Drawing Figures

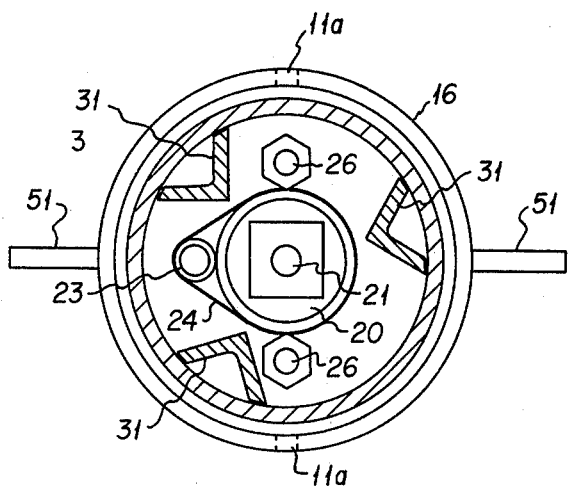
FIG. 4
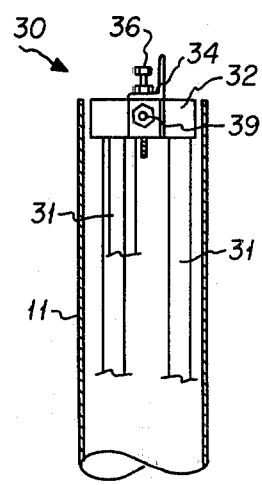
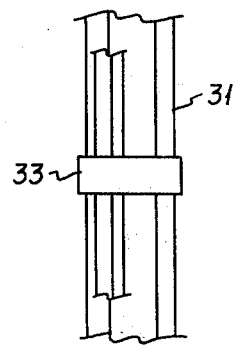
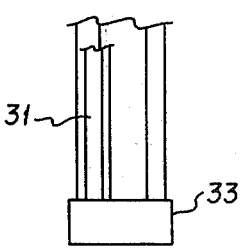
FIG. 5
FIG. 7
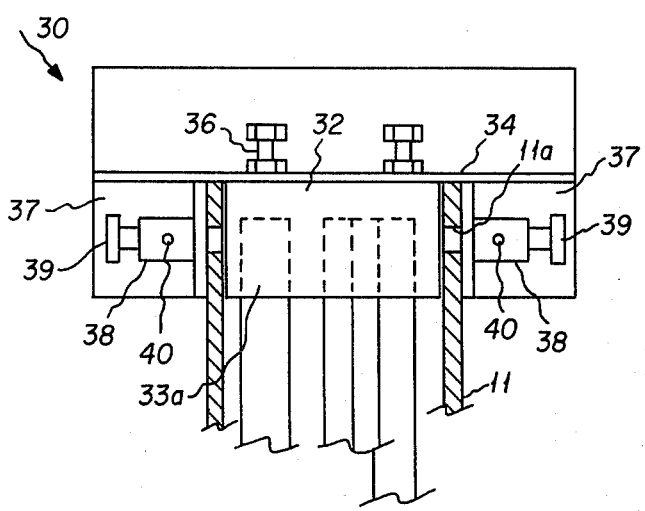
FIG. 6

BENCHMARK FOR USE IN ARCTIC REGIONS

BACKGROUND OF THE INVENTION

The present invention relates to an arctic benchmark and more particularly relates to a method and apparatus for installing a benchmark in an arctic region wherein the benchmark provides a highly accurate, reliable position and elevation reference mark even after prolonged exposure to arctic conditions.

As is well known, "benchmarks" are reference points of known elevation and position which are used in surveying operations. Some benchmarks are merely marks on permanent-type structures or landmarks, e.g. buildings, walls, trees, etc. while others e.g. markers or monuments such as stakes, concrete blocks, have to be installed at known positions and elevations. The latter benchmarks are usually driven or otherwise set in the ground to a depth at which their positions and elevations will not be changed or disturbed by normal surface conditions.

However, in arctic regions, due to the natural composition of the arctic land surfaces, problems arise in providing benchmarks which are reliable over prolonged periods of time. As shown, the permafrost layer which covers most land areas in the arctic regions has an "active layer" extending from the surface to a depth of approximately six feet. This active area undergoes partial thawing during "summer" months and refreezing in "winter" months. When a benchmark is set into or through this active area, the changing conditions thereof can cause shifting or subsidence of the benchmark which, in turn, leads to inaccurate readings (especially elevational readings) during subsequent survey operations. Although the inaccuracies in the readings may be small, they are of great concern whenever the readings from the benchmarks are relied upon to determine when and if a particular piling, building or other structure is subsiding and to what extent.

SUMMARY OF THE INVENTION

The present invention provides a benchmark which is to be installed in an arctic region and one which continues to provide an accurate, reliable reference point even after prolonged periods of exposure. The present benchmark is installed so that it is effectively isolated from direct contact with the active layer of the permafrost thereby eliminating any effects that the partial thawing and refreezing of the active layer may have on the position or elevation of the benchmark. Also, the benchmark includes means for reading the temperature at points along its length so that corrections based on known expansion coefficients can easily be made to thereby determine the exact elevation of the benchmark at any one time.

More particularly, the present benchmark is comprised of a marker element, e.g. a length of pipe, set inside a casing, both of which extend to a depth substantially below the active layer. To install the benchmark, a hole is formed completely through the active layer and into the underlying layer. An alignment jig mounts the marker element in the casing while they are initially positioned into the hole. A leveling clamp, which is removably mounted on the casing is used to plump and adjust the marker element to its precise elevation. The marker element extends to the bottom of the hole while the casing terminates at a depth which is above the bottom of the hole but below the bottom of the active layer.

A settable material, e.g. sand-water slurry which will freeze at ambient conditions, is poured into the hole to fill the hole to a point just above the lower end of the casing and is allowed to set, thereby securing the casing and marker element in a fixed position. The remainder of the hole around the casing is then filled with solid or with additional settable material. The annulus within the casing around the marker element is filled with fluidic material which will not freeze under ambient conditions, e.g. grease. Since the marker element does not directly contact any part of the active layer and since it is in contact with the casing only through the fluidic material, the marker element is effectively isolated from contact with the active layer so that the thawing and refreezing of the active layer do not disturb the position or elevation of the benchmark. Temperature sensors, positioned in a conduit attached to the marker element, provide constant temperature readings which relate to known expansion coefficients for the marker element and are used to properly adjust the actual elevational readings as is well known in the surveying art.

BRIEF DESCRIPTION OF THE DRAWINGS

The actual construction, operation, and the apparent advantages of the invention will be better understood by referring to the drawings in which like numerals identify like parts and in which:

FIG. 4 is a cross-sectional view taken along line 4—4 of FIG. 2 with alignment jig in place;

FIG. 5 is a perspective view, partly broken away, of the alignment jig used in the present invention;

FIG. 6 is a perspective view, partly in section, of the upper end of the alignment jig of FIG. 5 as mounted on the casing;

FIG. 7 is a plan view of FIG. 6 with the casing removed;

DESCRIPTION OF THE PREFERRED EMBODIMENT

Figure 1:
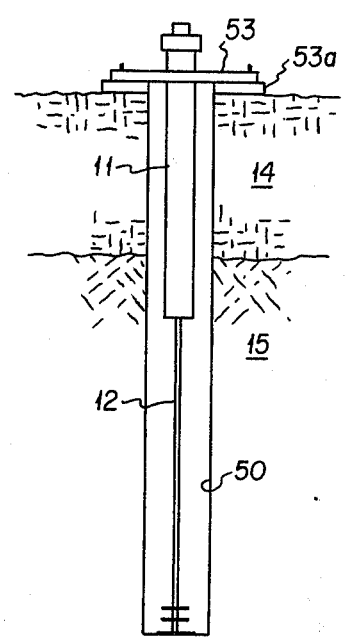
FIG. 1 is a sectional view of the present benchmark installed in an arctic region.

Referring more particularly to the drawings, FIG. 1 discloses arctic benchmark 10 installed in an arctic region. Benchmark 10 is comprised of casing 11 and marker 12, both of which are positioned entirely through active layer 14 of permafrost 15. As understood by those skilled in the art, active layer 14 is that layer 14, e.g. approximately the upper six feet of the permafrost, which experiences some thawing during the "summer" months and then refreezes during the winter.

Figure 3:
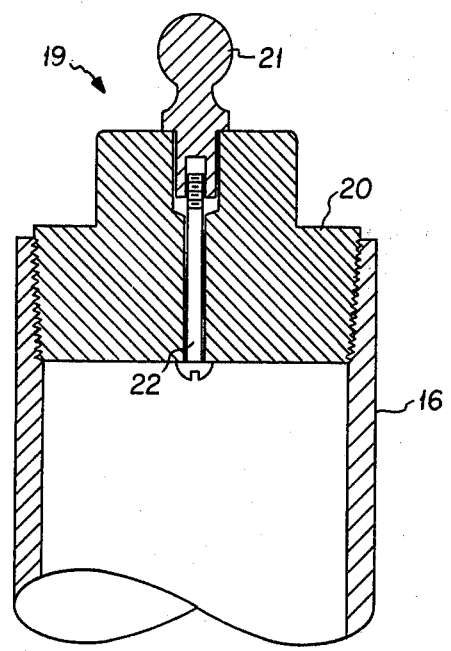
FIG. 3 is a sectional view of the upper end of the marker element of the present invention.
Figure 2:
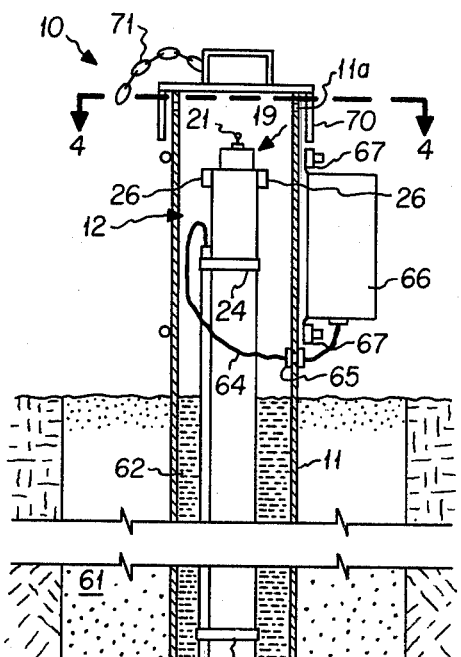
FIG. 2 is an enlarged sectional view, partly broken away, of the benchmark of FIG. 1.
Figure 2:
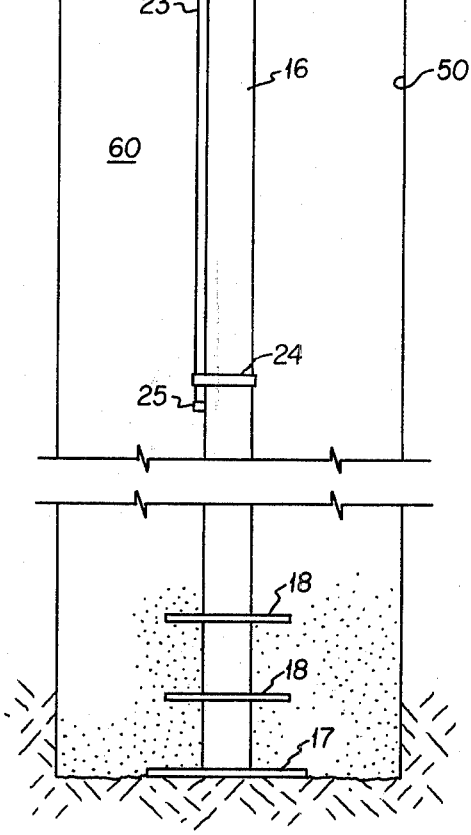

As seen more clearly in FIG. 2, marker element 12 is comprised of a length of relatively small diameter (e.g. 2 inch) pipe 16 having foot plate 17 (e.g. 8 inch diameter) secured to its lower end. Also secured to pipe 16 near its lower end and spaced thereon are two additional plates 18, the purpose of which will be explained later. Threaded into or otherwise secured to the upper end of pipe 16 is elevation reference element 19. As shown in FIG. 3, element 19 is comprised of threaded plug 20 having spherical-shaped reference knob 21 secured thereto by means of screw 22 or the like. A length of conduit 23 is secured to pipe 16 by straps 24 or the like for a purpose to be described later. Conduit 23 is closed at its lower end by cap 25. Threaded nuts 26 are secured to the upper end of pipe 16 by welding or the like as shown in FIGS. 1 and 4.

Alignment jig 30 (FIGS. 4–7) is used in the installation of benchmark 10. Jig 30 is comprised of elongated support members 31, e.g. angle iron, which are connected to and depend from attachment cap 32 and which have stiffener rings 33 secured thereto at spaced intervals along their lengths. Cap 32 is comprised of support ring 33a which has support members 31 welded thereto and plate 34 which is secured across the top of ring 33a. Plate 34 has two threaded openings 35 therein which receive threaded bolts 36. Connected to and depending from the lower side of plate 34 are supports 37 on which pin holders 38 are mounted. Latch pins 39 are slidably positioned in pin holders 38. Each pin 39 has an opening therein which aligns with opening 40 in its respective pin holder 38 so that pins 37 can be locked in position by means of cotter pins (not shown) inserted through the respective aligned openings.

To install benchmark 10, a large diameter hole 50 (FIGS. 1 and 2), e.g. 18 inches in diameter, is formed, e.g. dry augered, to depth, e.g. 22 feet, which is substantially below the bottom of active layer 14. Marker element 12 is mounted in alignment jig 30 by threading bolts 36 on jig 30 into nuts 26 on marker element 12. Jig 30 and the attached marker element 12 is then positioned within a larger diameter casing 11, e.g. 6 inch diameter, and is releasably secured thereto by means of latch pins 39 which are moved into holes 11a on casing 11 (FIGS. 4, 6). Cotter pins (not shown) are inserted through openings 40 on pin holders 38 to lock pins 39 in position. Casing 11, jig 30, and marker element 12 are then lifted as a unit by means of a winch and lifting lugs 51 on casing 11 (FIG. 4) and are suspended into hole 50.

Figure 9:
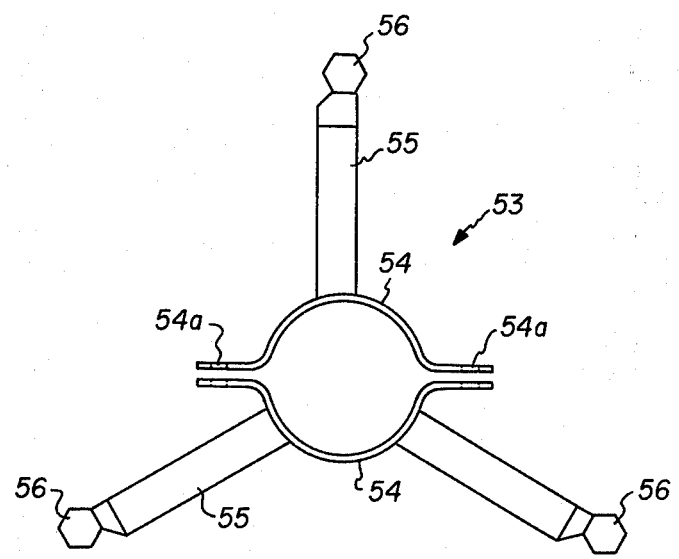
FIG. 9 is a plan view of FIG. 8.
Figure 8:
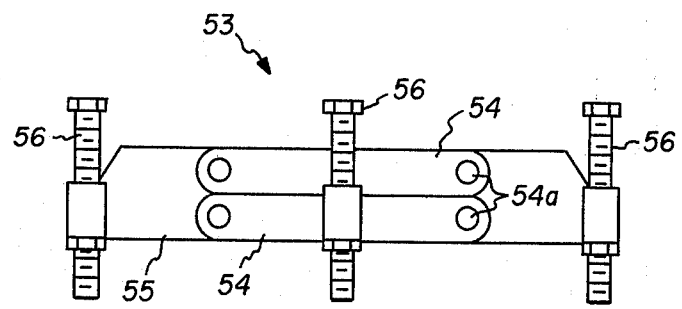
FIG. 8 is an elevational view of the installation clamp of the present invention.

Leveling clamp 53 (FIGS. 1, 8 and 9) is then positioned and secured onto casing 11. Clamp 53 is comprised of pipe clamps 54 which has three legs 55 attached thereto. A threaded, leveling bolt 56 is provided at the end of each leg 55. Clamp 53 is assembled onto casing 11 and is held thereon by bolts (not shown) through openings 54a in pipe clamps 54. Clamp 53 is secured against movement on casing 11 and is preferably positioned on a firm base material, e.g. ¾ inch exterior plywood (53a, FIG. 1) which in turn is positioned on the surface of active layer 14 about hole 50. By proper manipulation of leveling bolts 56 on clamp 53 and by using known surveying techniques, casing 11 and marker element 12 are plumbed within hole 50 and elevation reference knob 21 on pipe 16 is set at a known elevation.

Next the lower portion 60 (FIGS. 1 and 2) of hole 50 is filled with a settable material such as a material which freezes at ambient conditions, e.g. a slurry of sand and fresh water. Hole 50 is filled with this material to a height (e.g. 2 inches) just above the lower end of casing 11. It can be seen from FIG. 1 that casing 11 extends substantially below (e.g. 4 feet) the bottom of active layer 14. The settable material fills around plates 17, 18 at lower end of pipe 16 thereby providing good stability and anchoring of benchmark 10 in hole 50. The material in portion 60 of hole 50 is allowed to set, e.g. freeze solid, after which the remaining portion 61 of hole 50 is filled with the same sand-water slurry, drilling cuttings, plain sand, or any similar-type material.

Bolts 36 are then unthreaded from nuts 26 on pipe 16, latch pins 39 are retracted from openings 11a, and jig 30 is removed from casing 11. Annulus 62 between pipe 16 and casing 11 above the frozen material of portion 60 is now filled with a fluidic material which will not freeze to a solid at ambient conditions, e.g. low-temperature, multipurpose grease such as Lubriplate, distributed by Fiske Brothers Refining Co. of Newark, N.J. This material is heated to 180° F. and mixed thoroughly and then allowed to cool to approximately 125° F. before the mixture is poured into annulus 62. Leveling clamp 53 is removed from casing 11.

Temperature sensors supported on one or more leads 64 (FIG. 2) are then fed through fitting 65 on casing 11 and are run into conduit 23 on pipe 16. Preferably at least one sensor is located at a depth below active layer 14 (e.g. at a depth of 13 feet below the surface) and at least one sensor is located within the active layer (e.g. a depth of 5½ feet below the surface). The sensors may be of any type which provide a direct reading to a respective gage (not shown), which, in turn, is mounted in box 66 which is mounted on casing 11 by bands 67 or the like. Examples of suitable temperature sensor indicators are capillary type dial thermometers such as Models Nos. T-2100-22, T-2100-52 distributed by Johnson Controls.

Protector cap 70 is positioned on casing 11 to close the upper end thereof when not in use. Chain 71 is connected between cap 70 and lifting lugs 51 so cap 70 will not be lost when removed from casing 11. Further, a guard fence (not shown) may be built around benchmark 10 for additional protection and snow poles can be used for locating the benchmark under certain hostile conditions as understood in the art. Still further, although one specific installation technique has been described above, it should be recognized that this technique may be modified slightly to achieve the same result. For example, casing 11 may be centered in hole 50 before alignment jig 30 and attached marker element 12 is positioned into casing 11.

When a survey is to be made, protective cap 70 is removed from casing 11 and a level rod or similar surveying device (not shown) is positioned onto knob 21 of marker element 12. By having a spherical reference surface (i.e. knob 21,) the normally flat-bottomed surveying device can easily be manipulated into a vertical position by the person holding the device on knob 21 upon directions from the surveyor. Reading are then made by well known surveying techniques. The temperatures are also read from the gages in box 66 and by using these and the surface temperature, an average temperature can be calculated for which a correction factor is known which, in turn, is used to correct the observed readings to their final values.

It can be seen from the above that the present arctic benchmark, being effectively independent of any changes that the active layer may experience, provides a reliable reference point for surveying operations in arctic regions even after prolonged exposure to hostile and changing conditions.

What is claimed is:

1. A benchmark for an arctic region having an active surface layer which partially thaws and then refreezes over prolonged periods, said benchmark comprising:
   a casing set through said active layer and into the layer underlying said active layer;

a marker element extending completely through said casing and into said underlying layer, said marker element comprising:

a length of pipe; and a reference element mounted on the upper end of said pipe; and fluidic material in said casing around at least that portion of said marker element that pass through said active layer, said fluidic material being material which does not freeze under ambient conditions.

2. The benchmark of claim 1 wherein said reference element comprises:

a plug threaded on the upper end of said pipe; and a spherical-shaped knob mounted on said plug.

3. The benchmark of claim 2 including:

a conduit attached to said pipe; and means for sensing temperature positioned within said conduit.

4. The benchmark of claim 3 including:

a plate secured to the lower end of said pipe to aid in securing said pipe in said underlying layer.

* * * * *